US009885413B2

(12) United States Patent
Martini et al.

(10) Patent No.: US 9,885,413 B2
(45) Date of Patent: Feb. 6, 2018

(54) SLIDING SLEEVE FOR SUPPORTING SUN GEARS

(71) Applicant: Schaeffler Technologies AG & Co. KG, Herzogenaurach (DE)

(72) Inventors: Harald Martini, Herzogenaurach (DE); Thorsten Biermann, Wachenroth (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 99 days.

(21) Appl. No.: 15/030,161

(22) PCT Filed: Oct. 14, 2014

(86) PCT No.: PCT/DE2014/200552
§ 371 (c)(1),
(2) Date: Apr. 18, 2016

(87) PCT Pub. No.: WO2015/067262
PCT Pub. Date: May 14, 2015

(65) Prior Publication Data
US 2016/0245391 A1 Aug. 25, 2016

(30) Foreign Application Priority Data
Nov. 8, 2013 (DE) ........................ 10 2013 222 731

(51) Int. Cl.
*F16H 57/04* (2010.01)
*F16H 57/08* (2006.01)
(Continued)

(52) U.S. Cl.
CPC ........... *F16H 57/043* (2013.01); *F16H 48/10* (2013.01); *F16H 48/11* (2013.01);
(Continued)

(58) Field of Classification Search
CPC ...................................................... F16H 57/04
See application file for complete search history.

(56) References Cited

U.S. PATENT DOCUMENTS

| 1,758,584 A * | 5/1930 | Rarig ................. B60B 27/065 180/340 |
| 2006/0084546 A1* | 4/2006 | Kohno ............... F16H 57/0483 475/160 |
| 2011/0172048 A1* | 7/2011 | Nishida .............. F16C 17/102 475/159 |

FOREIGN PATENT DOCUMENTS

| DE | 102011085119 B3 | 2/2013 |
| DE | 102011081976 A1 | 3/2013 |
| DE | 102011087568 A1 | 6/2013 |

* cited by examiner

*Primary Examiner* — Tisha Lewis
(74) *Attorney, Agent, or Firm* — Simpson & Simpson, PLLC

(57) ABSTRACT

A differential transmission for a motor vehicle comprising a driving gear wherein the driver gear introduces torque to the transmission; a first output element and a second output element wherein the first and second output elements output torque from the transmission; a differential cage designed for transmitting torque from the driving gear to the first output element, wherein the differential cage is non-rotatably connected to the driving gear, and the first output element is rotationally arranged to the differential cage; a sliding sleeve wherein the sliding sleeve is arranged between the differential cage and the first output element, wherein the sliding sleeve has a lubricating recess which extends in a spiral shape in the circumferential direction and is operatively arranged to provide a lubricating film.

10 Claims, 5 Drawing Sheets

(51) Int. Cl.
  *F16H 48/11* (2012.01)
  *F16H 48/10* (2012.01)
  *F16H 48/40* (2012.01)
(52) U.S. Cl.
  CPC ....... F16H 57/0483 (2013.01); F16H 57/082 (2013.01); *F16H 2048/106* (2013.01); *F16H 2048/405* (2013.01)

SLIDING SLEEVE FOR SUPPORTING SUN GEARS

CROSS-REFERENCE TO RELATED APPLICATIONS

The present application is the U.S. national stage application pursuant to 35 U.S.C. § 371 of International Application No. PCT/DE2014/200552, filed Oct. 14, 2014, which application claims priority from German Patent Application No. DE 10 2013 222 731.0, filed Nov. 8, 2013, which applications are incorporated herein by reference in their entireties.

FIELD

The disclosure relates to a differential transmission for a motor vehicle, the differential transmission comprising a driving gear, by means of which the torque can be introduced into the transmission, and comprising a first output element and a second output element, by means of which the torque can be outputted from the transmission, comprising a differential cage, which is designed for transmitting the torque from the driving gear to the first output element, wherein the differential cage is non-rotatably connected to the driving gear; and the first output element is arranged in such a way that the first output element can be rotated in relation to the differential cage; wherein a sliding sleeve is arranged between the differential cage and the first output element.

BACKGROUND

German patent DE102011085119B3, discloses differential transmissions. Thus, this document discloses a spur gear differential, comprising a planetary gear carrier and two sun gears, which can be rotated in relation to the planetary gear carrier, at least one friction disk and at least one spring means, which biases the sun gears relative to the planetary gear carrier. In this case the spring means is spring-mounted, on the one hand, against a sun gear or the planetary gear carrier and, on the other hand, against an axial bearing. The geometrical and functional features, Which are disclosed in the German patent, shall be considered to be incorporated herein.

An earlier application, which was filed by the applicant and which is not a prior publication, discloses a differential transmission in the form of a planetary gear transmission with at least one sun gear (wheel) and at least one planet carrier, which is arranged coaxially and rotatably to the sun gear (wheel). In this case a bearing sleeve is inserted between the at least one sun gear (wheel) and the planet carrier in such a way that the bearing sleeve has a supporting effect on the sun gear (wheel) axially and/or radially relative to the planet carrier.

The object of the disclosure is to provide a differential transmission that exhibits optimized lubrication and guide, low bearing play, optimized running characteristics, optimized utilization of the installation space and/or easy assembly. Furthermore, the wear resistance and the service life shall be improved, and the production costs and running noises, occurring in service, shall be reduced.

SUMMARY

The object, on which the disclosure is based, is achieved by means of a device, conforming to its genre, in that the sliding sleeve or sliding bearing sleeve has a lubricating recess, groove or lubricating pocket, which extends in a spiral shape in the circumferential direction and is operatively arranged to provide a lubricating film. In this case the lubricating film is provided between two components, which can be rotated relative to each other and are supported on each other, for example, in the radial direction.

Advantageous embodiments of the disclosure are claimed in the dependent claims and will be explained in greater detail below.

The term "in a spiral shape" is defined, according to the disclosure, to include, in particular, spiral shapes with constant pitch as well as such geometrical configurations of varying slope. A single spiral or a plurality of spirals may be provided. The lubricating recess may extend in a meander shape, in particular, in the circumferential direction. In other words, the lubricating recess may be designed in the form of a spiral with alternating direction of curvature.

The driving gear may be designed as a driving gearwheel. The first output element and/or the second output element can be designed as the output gearwheels.

The sliding sleeve is manufactured preferably without machining. It may be, in particular, a sheet metal component, which is produced by means of cold forming, for example, deep drawing and/or stamping. Then the sliding sleeve is very inexpensive and lightweight. As an alternative, the sliding sleeve can be produced by molding methods and optionally can be mechanically finish machined.

According to one embodiment of the disclosure, the sliding sleeve is inserted, preferably pressed, into the differential cage in a force fining manner. As an alternative, the sliding sleeve may be put, in particular, pressed onto the output element in a force fitting manner. The sliding sleeve is mounted in the differential cage or more specifically on the output element in such a way that its position is stable, an arrangement that has the effect of reducing play and backlash. Furthermore, in the case of a continuous lubricating recess in the radial direction, it is possible to seal the lubricating recess in the radial direction in a very simple and effective way.

In one embodiment the sliding sleeve forms a bearing element, preferably a single bearing element, with which the differential cage and an output element are mounted and positioned relative to each other in the axial and/or radial direction. The sliding sleeve can be made in such a way that it is hardened, in particular, in sections, in particular, in the area of the running or supporting surfaces.

The lubricating recess can extend from a starting area to an end area, which is offset in the axial direction without interruption or may be interrupted by at least one reinforcing web. In this way it is possible to achieve, on the one hand, a particularly uninterrupted lubricating film design, even with a heavy radial load, and, on the other hand, a particularly stable embodiment, i.e. an exemplary embodiment that absorbs high radial forces.

According to one embodiment of the disclosure, the lubricating recess is formed as a continuous groove. As an alternative, there may be a plurality or number of reinforcing webs that divide the lubricating recess into individual lubricating pockets, preferably into discrete, separate lubricating pockets. The provision of such lubricating pockets makes it possible to optimize the lubrication of the sliding bearing and also its operating characteristics, in particular, the load carrying capacity of the sliding sleeve. The lubricating pockets may be distributed, in particular, may be evenly distributed over the running surface of the sliding sleeve in the axial direction and/or in the circumferential direction, so that even in the vicinity of a lubricating pocket there is always a sufficient support surface area for a bearing arrangement in both the circumferential direction and the axial direction.

Even though the objective of achieving a component that has a particularly high load bearing capacity has been met, the manufacturing costs can be kept very low, if the sliding sleeve is manufactured without machining, in particular, if the sliding sleeve is a sheet metal component. In this case deep drawing processes or even molding processes are useful.

It is preferred that the lubricating recess be formed as a through-hole from a radially inner surface as far as up to a radially outer surface. Such a design is particularly easy to manufacture by punching the lubricating recess and offers a lubricating recess with an especially large volume, based on the strength (thickness) of the sliding sleeve, so that sufficient lubricant can be accommodated in the recess.

The lubricating recess may be introduced, preferably punched, as a through-hole from the inside to the outside. In particular, the lubricating recess may be introduced, for example, by punching, as a through-hole from a running surface of the sliding sleeve in the direction of a surface that is opposite the running surface. Such a design achieves the advantage that the lubricating recess can be easily formed on the side of the running surface and is easy to make without burr, so that there is no need for special additional manufacturing steps for deburring. The lubricating recess is introduced into the sliding sleeve preferably without machining.

In another advantageous embodiment a lubricating pocket extends more or less in the circumferential direction of the sliding sleeve. In particular, the lubricating pocket can be elongated in the circumferential direction; in particular, it may be elongated in an oval fashion. The lubricating pocket has preferably a length that allows a load bearing lubricating film in the radial direction.

In the case of a plurality or number of lubricating pockets, these lubricating pockets may be offset from one another in the axial direction of the sliding sleeve. The lubricating pockets may overlap or cover each other, in particular, in the circumferential direction of the sliding sleeve or in the axial direction of the sliding sleeve.

Preferably the width of a lubricating pocket, measured in the axial direction, is equal to approximately ⅕ to approximately ⅓ of length of the lubricating pocket, measured in the circumferential direction. It is especially preferred that the width of a lubricating pocket be equal to approximately ¼ of the length thereof. This feature makes it possible to build up a load bearing lubricating film in an advantageous manner, while at the same time the supporting surface of the sliding sleeve is reduced as little as possible in the axial direction.

The differential transmission may be designed, in particular, as a planetary gear differential transmission, a bevel gear differential transmission or a spur gear differential transmission. In the case of a planetary differential transmission, the differential cage forms a planet carrier. This planet carrier may be constructed in two parts. The first drive element forms a first sun gear, in particular, a first sun gearwheel; and the second drive element forms a second sun gear, in particular, a second sun gearwheel. Then the sliding sleeve is arranged between the planet carrier and a sun gear. The sliding sleeve can position and mount the planet carrier and the sun gear relative to each other in the radial and/or axial direction.

It can also be said that the disclosure relates to the mounting of a sun gearwheel of a lightweight differential. Owing to the openings, which are located on the periphery of the sliding sleeve in the shape of a spiral and which form the lubricating pockets, the contact between the sun gearwheel and the sliding bearing sleeve can be optimized. The sliding or bearing sleeve can be used to support the sun gear or the sun gears in both the radial and also the axial direction. The bearing point is usually subject to forces acting on the bearing point by way of an axle, supporting a compensating joint. The bearing sleeve, which is provided with openings on the periphery in the shape of a spiral, makes sure that there is sufficient lubrication at the bearing point. In particular, the openings may be continuous from the inside to the outside. The oil pockets are formed by pressing the sliding bearing sleeve into the support flange; and a limited, but sufficient oil reservoir is stored in these oil pockets. The disclosure can be used, in particular, in lightweight differentials for final drives in passenger vehicles.

BRIEF DESCRIPTION OF THE DRAWINGS

Various embodiments are disclosed, by way of example only, with reference to the accompanying drawing in which corresponding reference symbols indicate corresponding parts, in which.

DETAILED DESCRIPTION

At the outset, it should be appreciated that like drawing numbers on different drawing views identify identical, or functionally similar, structural elements. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing the example embodiments.

Figure 1:
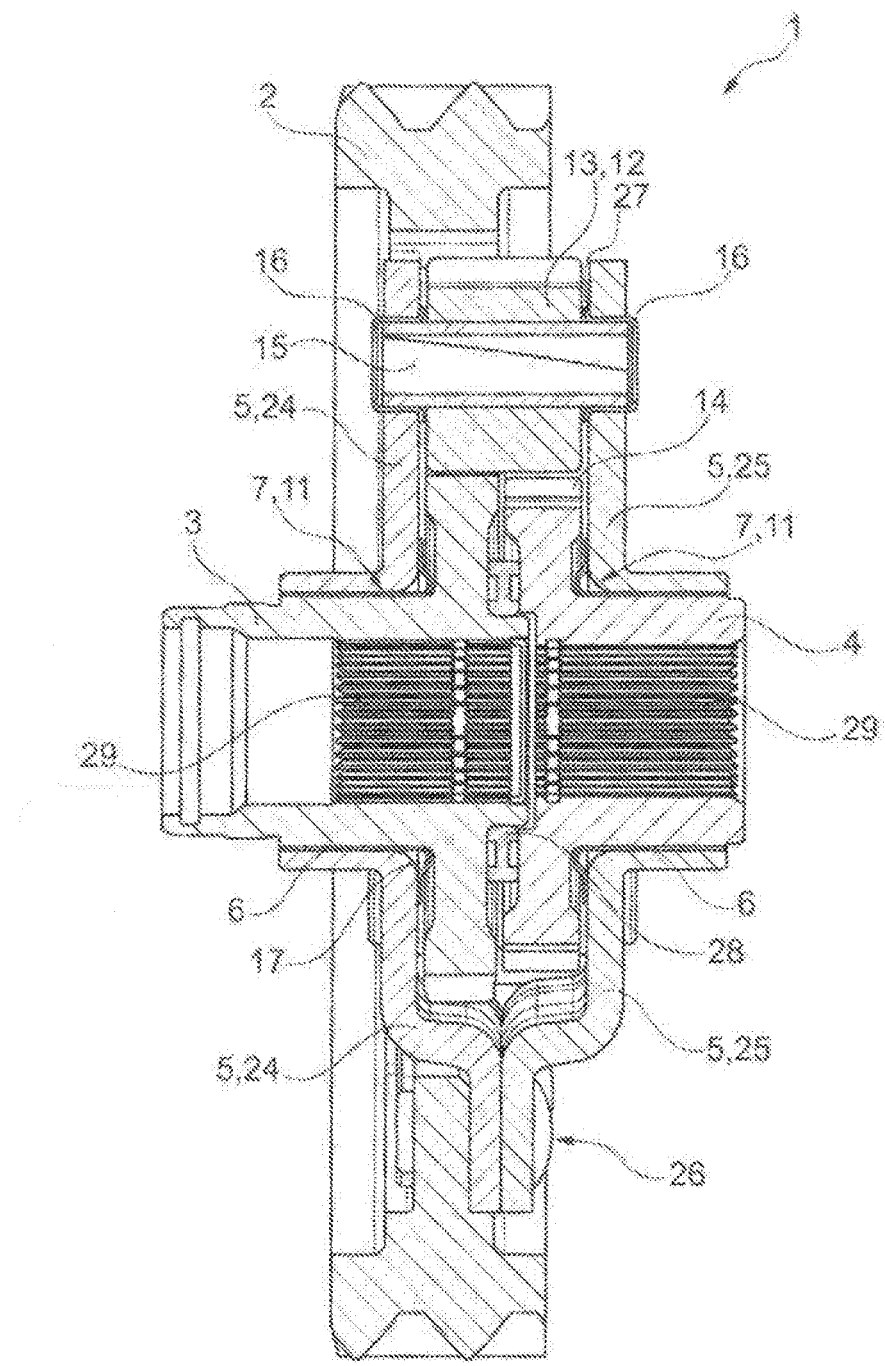
FIG. 1 shows a longitudinal view of a differential transmission according to the invention.

FIG. 1 shows an inventive differential transmission 1 according to the disclosure. The differential transmission 1 is designed as a planetary gear transmission, in particular, as a spur gear differential. The differential transmission has a driving gear 2, a first output element in the form of a first sun gear 3, a second output element in the form of a second sun gear 4, a differential cage in the form of a planet carrier 5 and a sliding sleeve 6 as a sliding bearing sleeve.

The differential transmission 1 has several pairs 12 of planet gears 13 and 14. In contrast to the second planet gear 14, the first planet gear 13 has a longer axial length. The axial length is measured along the axis of rotation of the differential transmission 1. The varying axial length of the two planet gears 13 and 14 can be seen in FIGS. 1 and 3.

FIG. 1 shows only the first planet gear 13 of the planet gears 13 and 14 of the differential transmission 1 in its entirety; of the planet gear 14, only a part of the teeth can be seen, because the teeth are covered for the most part by the planet gear 13. The sun gear 3 meshes with the first planet gear 13; and the other sun gear 4 meshes with the second planet gear 14. The two planet gears 13 and 14 of a pair 12 of planet gears also mesh with each other.

The planet gear 13 is mounted on a bolt 15. The bolt 15 is disposed in sleeves 16, which are hardened, in particular, fully hardened, in the planet carrier 5. The sleeves 16 have radially projecting flanges 27, which rest against the planet gear 13 and determine the axial position thereof. The planet gear 14 may be mounted accordingly.

The two sun gears 3 and 4 have internal teeth 29, by means of which the torque can be transmitted on transmitting elements, which are not shown in the figures, to the wheels of a motor vehicle. A friction disk 28 is disposed between the two sun gears 3 and 4. The friction disk may also be referred to as the friction ring.

It should be noted that the tip circle diameters of the two sun gears 3 and 4 are different. In this case the tip circle diameter of the small sun gear 4 is smaller than the root circle diameter of the large sun gear 3. The small sun gear 4 is approximately 20% smaller than the large sun gear 3. In traction mode the smaller planet gear of the pair 12 of planet gears 13, 14 runs ahead of the large planet gear. The inventive solution reduces the noise emission. Any problems arising with respect to the support width are also minimized. Even limited slip values of up to 30% can be achieved without any major problems. In this way it is possible to generate a so-called Torsen differential.

Figure 3:
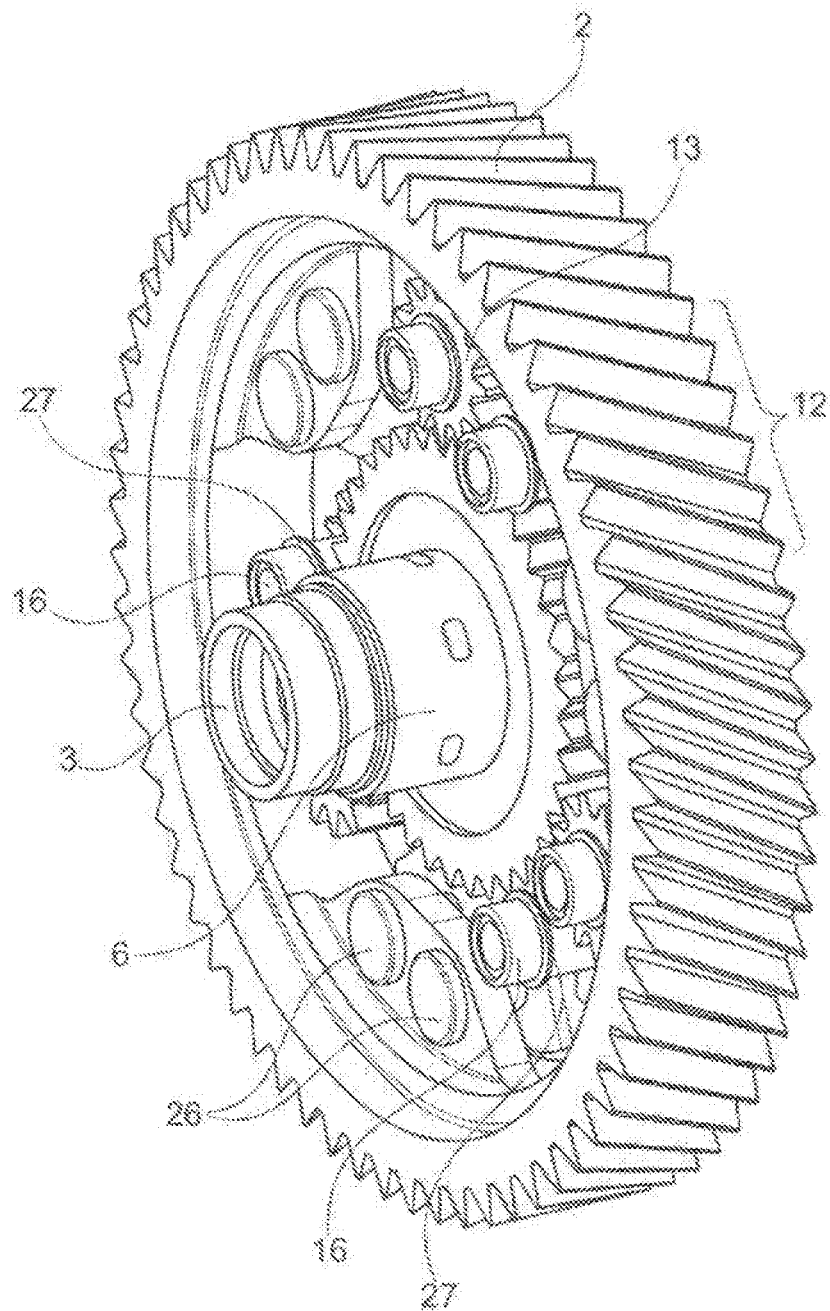
FIG. 3 is a perspective view of a variant of an inventive differential transmission with the sliding sleeve installed.

In the exemplary embodiment that is shown, the planet carrier 5 is a sheet metal component. The planet carrier has a first planet carrier subelement 24 and a second planet carrier subelement 25. The bolt 15 for mounting the planet gears 13, 14 is received in the manner described above, on the one side, in the first planet carrier subelement 24 and on the opposite side in the second planet carrier subelement 25. The first planet carrier subelement 24 is connected to the second planet carrier subelement 25 by means of screw connections 26, which are distributed over the periphery and of which only one is shown in FIG. 1. FIG. 3 shows two screw connections 26 in their entirety and a third screw connection 26 in part. The planet carrier 5, which is designed as a sheet metal component in the exemplary embodiments that are shown herein, may also be made as a cast or forged part.

Figure 2:
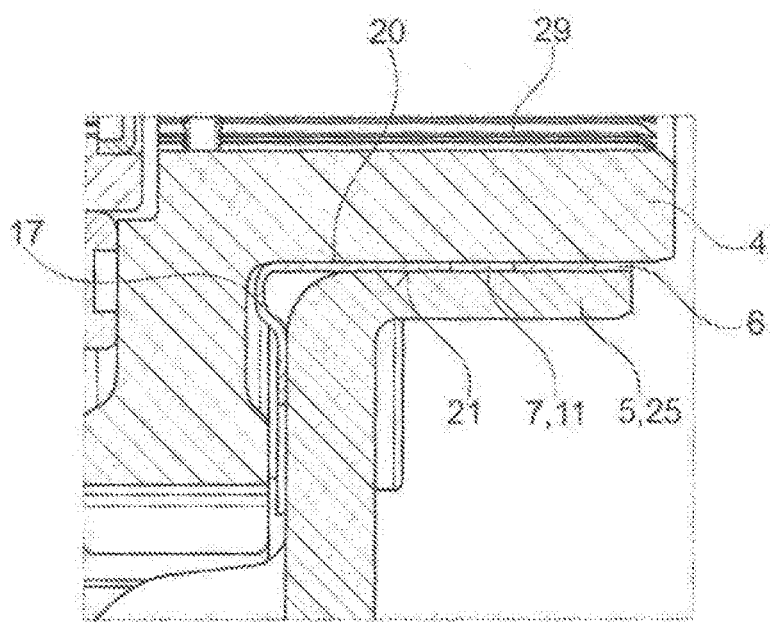
FIG. 2 shows an enlarged view of the connecting region between the differential cage and an output element of the differential transmission according to FIG. 1.

As shown, in particular, in FIGS. 1 and 2, the sliding sleeve 6 is disposed as a bearing sleeve between the sun gear 3 and the planet carrier 5 (the differential cage). FIG. 1 shows, in particular, that a sliding sleeve 6 may also be disposed between the sun gear 4 and the planet carrier 5, so that this mounting arrangement is designed in conformity with the mounting arrangement between the sun gear 3 and the planet carrier 5. The sliding sleeve 6 is described below with reference to the sliding sleeve 6, which is shown on the left in FIG. 1, for the sun gear 3, but also relates accordingly to the right sliding sleeve 6 for the sun gear 4.

The sliding sleeve 6 is designed in such a way that it has a supporting effect on the sun gear 13 in the axial and radial direction and keeps the sun gear spaced apart from the planet carrier 5 in the axial and radial direction. In addition, the sliding sleeve has a bulge 17 or a plurality of bulges 17, which is or are located between a radially outwards projecting support area 18 and an axially aligned contact area 19.

The sliding sleeve 6 is press connected to the planet carrier 5 in the contact area 19. In this case the surface of the contact area 19 that faces the sun gear 3 forms a running surface 20, on which the sun gear 3 is slidably mounted and relative to which the sun gear rotates. As an alternative, the sliding sleeve 6 may be pressed onto the sun gear 3, in which case its outer surface 21 forms the running surface, in such a way that the running surface can slide relative to the planet carrier 5.

The bulge 17 may exhibit a first hardening area 22, which extends in the axial direction. In particular, the entire running surface 20 may be hardened. The bulge can have a second hardening area 23, which is arranged at right angles thereto and which extends in the radial direction. Additional hardening areas may also be provided. In order to form a hardening area 22, 23, an induction hardening process may be useful. Case hardening is also possible.

It is apparent from the figures that the running surface 20 and/or a part of the bulge 17 form and/or forms a radial bearing section for the sun gear 3, whereas the bulge 17 forms an axial bearing area for this purpose. The sliding sleeve 6 may have spring characteristics at least in sections, in order to compensate for tolerances and to dampen any shocks that might occur.

In the installed state there is play between the first hardening area 22 of the bulge 17 and a flange region of the sun gear 3 that extends in the axial direction. Similarly play is present between the second hardening area 23 or more specifically the running surface 20 and a section of the sun gear 3 that extends in the radial direction. In this area a load bearing lubricating film builds up. The bulge 17 may also follow the outer contour of the sun gear 3 in an area that is bent by 90 deg. and may maintain a distance that is as small as possible.

The smallest diameter of the sliding sleeve 6 ranges between 43 mm and 45 mm and is preferably 44 mm. The outside diameter in the region of the axially aligned contact area 19 is preferably approximately 10% more, in particular, preferably 47.9 mm. The entire outside diameter at the largest point has a value of preferably 68 mm. It is advantageous for the outside diameter at the largest point to be one-third larger than the inside diameter at the smallest point of the sliding sleeve 6. Furthermore, it is advantageous for the axial length to be more than one quarter of the inside diameter, but less than half of the inside diameter, preferably 16 mm.

The sliding sleeve 6 has a wall of constant thickness. It is very clear from FIGS. 4 and 5 that the sliding sleeve is provided with the lubricating recess 7. This lubricating recess is interrupted by several reinforcing webs 10, so that a plurality of separate lubricating pockets 11 are formed, where in this case consecutive lubricating pockets 10 are separated from each other by a reinforcing web 10.

Figure 4:
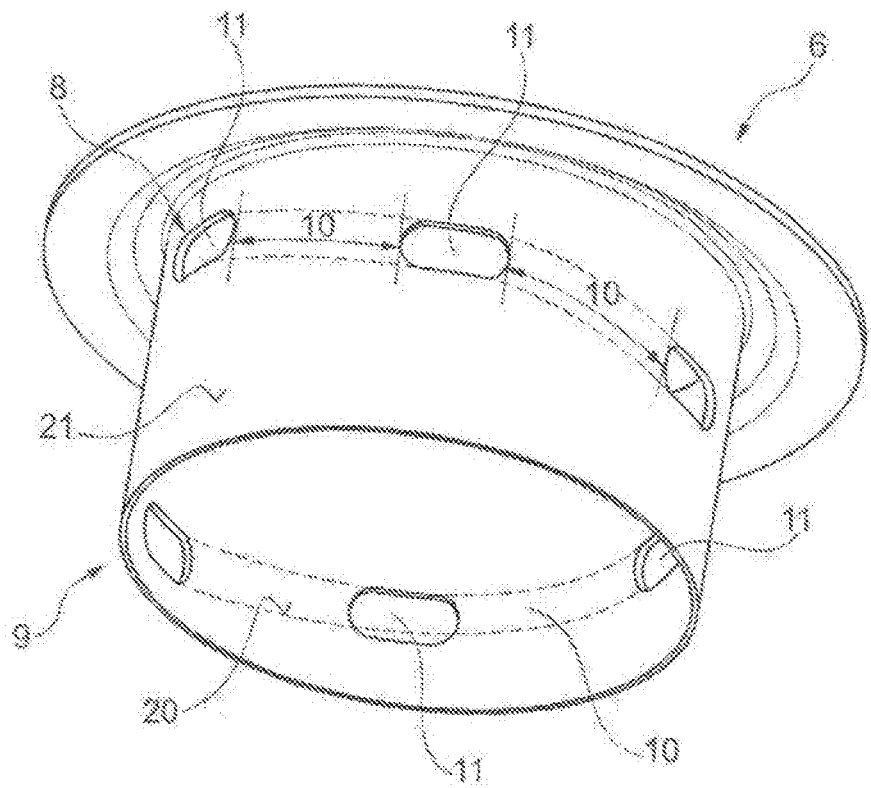
FIG. 4 is a perspective view of a sliding sleeve.
Figure 5:
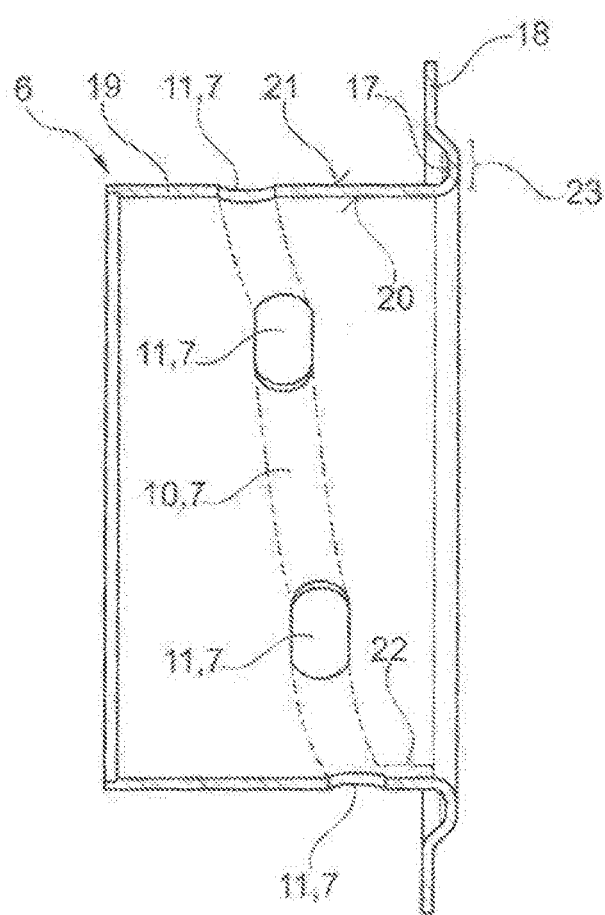
FIG. 5 is a sectional view of the sliding sleeve from FIG. 4.

The lubricating recess 7 and the consecutive lubricating pockets 10 with the in-between reinforcing webs 11 are arranged in a spiral shape in the circumferential direction of the contact area 19 of the sliding sleeve 6. It is especially clear from FIG. 5 that the lubricating pockets 10 can overlap each other in the axial direction. At the same time not only the consecutive, but also the non-consecutive lubricating pockets 10 can overlap each other in the circumferential direction. In the latter case the lubricating recess 7 is shaped in a meandering manner; or there are several lubricating recesses 7, for example, as a double or triple spiral, that is, with a plurality of turns. In particular, FIG. 4 shows that somewhere in the circumferential direction at least one lubricating pocket 10 is disposed preferably in each axial region of the running surface 20, so that this completely covering lubricating film can form on the running surface 20.

The lubricating pockets 10 are elongated in the circumferential direction and are more or less oval. The width of the lubricating pocket 10 is equal preferably to approximately ⅕ to ⅓ of the length of the lubricating pocket. It is especially preferred that its width be equal to approximately ¼ of its length. In the exemplary embodiment that is shown herein, the length of the lubricating pocket 10 in the circumferential direction ranges between approximately 5 mm and approximately 10 mm, preferably between approximately 7 mm and approximately 9 mm, in particular, is preferably approximately 8 mm. In the exemplary embodiment that is shown herein, the width of the lubricating pocket 10 in the axial direction ranges between approximately 3 mm and approximately 7 mm, preferably between approximately 4 mm and approximately 8 mm, in particular, is preferably approximately 5 mm.

FIG. 3 shows the planetary differential 1 without the planet carrier subelement 25 in a perspective view. Shown is the sliding sleeve 6 for the first sun gear 3. It can be seen that due to the press fit of the sliding sleeve 6 together with the lubricating recess 7 or more specifically the lubricating pockets 10 the surface of the sun gear 3 that is located below the sliding sleeve 6 forms a volume, which is only open in the direction of the running surface 20, for purposes of receiving a lubricating medium. FIG. 3 also shows the end regions of the bolts 15 with the sleeves 16 arranged thereon. In addition, it is shown that the driving gear 2 may have helical teeth.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE NUMERALS 1 differential transmission
2 driving gear
3 output element, sun gear
4 output element, sun gear
5 differential cage, planet carrier
6 sliding sleeve
7 lubricating recess
8 starting area
9 end area
10 reinforcing web
11 lubricating pocket
12 pair
13 first planet gear
14 second planet gear
15 bolt
16 sleeve
17 bulge
18 support area
19 contact area
20 running surface
21 outer surface
22 hardening area
23 hardening area
24 first planet carrier subelement
25 second planet carrier subelement
26 screw connection
27 flange
28 friction disk
29 internal teeth

What is claimed is:

1. A differential transmission for a motor vehicle comprising:
a driving gear wherein the driver gear introduces torque to the transmission;
a first output element wherein the first output element outputs torque from the transmission;
a second output element wherein the second output elements outputs torque from the transmission;
a differential cage designed for transmitting torque from the driving gear to the first output element, wherein the differential cage is non-rotatably connected to the driving gear, and the first output element is rotationally arranged to the differential cage; and,
a sliding sleeve wherein the sliding sleeve is arranged between the differential cage and the first output element, wherein the sliding sleeve has a lubricating recess which extends in a spiral shape in the circumferential direction and is operatively arranged to provide a lubricating film.

2. The differential transmission recited in claim 1, wherein the lubricating recess extends from a starting area to an end area, which is offset in a first axial direction without interruption or is interrupted by one reinforcing web.

3. The differential transmission recited in claim 2, wherein the lubricating recess is formed as a continuous groove or a plurality of reinforcing webs that divide the lubricating recess into individual lubricating pockets.

4. The differential transmission recited in claim 1, wherein the sliding sleeve is manufactured without machining, in particular, is a sheet metal component.

5. The differential transmission recited in claim 1, wherein the lubricating recess is formed as a through-bore, which extends from a radially inner surface up to a radially outer surface.

6. The differential transmission, recited in claim 5, wherein the lubricating recess is introduced as a through-bore from the inside to the outside.

7. The differential transmission recited in claim 1, wherein the sliding sleeve is inserted, preferably pressed into, the differential cage in a force fitting and/or form fitting manner.

8. The differential transmission recited in claim 1, wherein the differential transmission is designed as a planetary gear differential transmission.

9. The differential transmission, recited in claim 1, wherein the differential transmission is designed as a spur gear differential transmission.

10. The differential transmission recited in claim 3, wherein the lubricating pocket extends essentially in the circumferential direction.

\* \* \* \* \*